Sept. 24, 1968   A. R. HOLLISTER ET AL   3,402,603
DETECTION SYSTEM

Filed March 24, 1966   2 Sheets-Sheet 1

INVENTORS
Allen R. Hollister
William J. Blaiklock

BY De Lio and Montgomery
ATTORNEYS

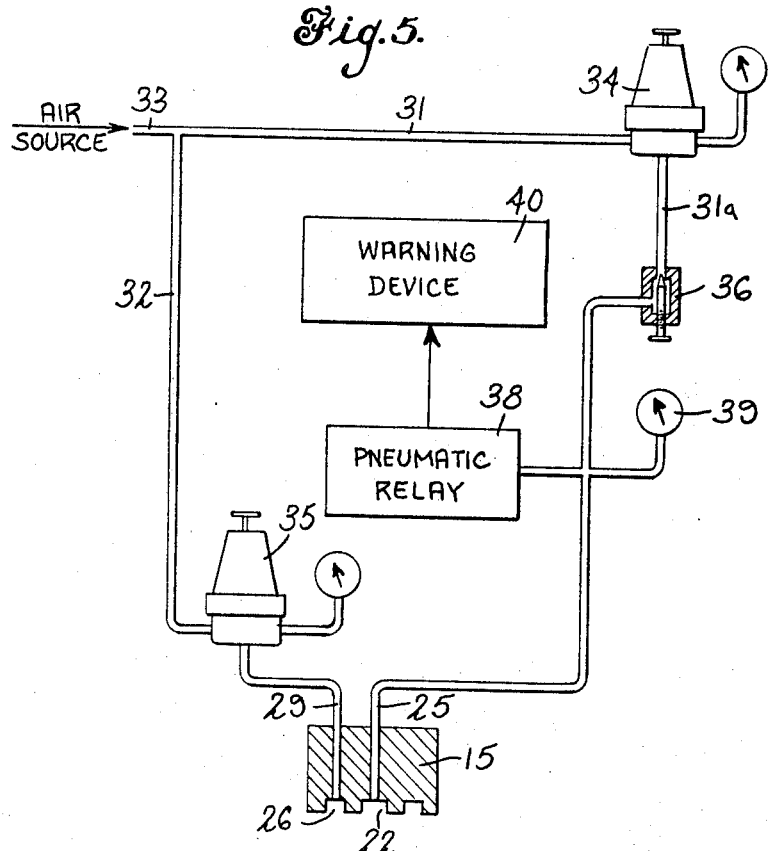
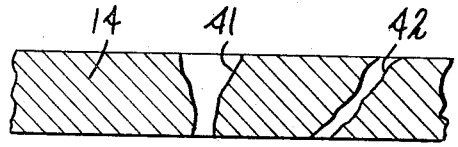
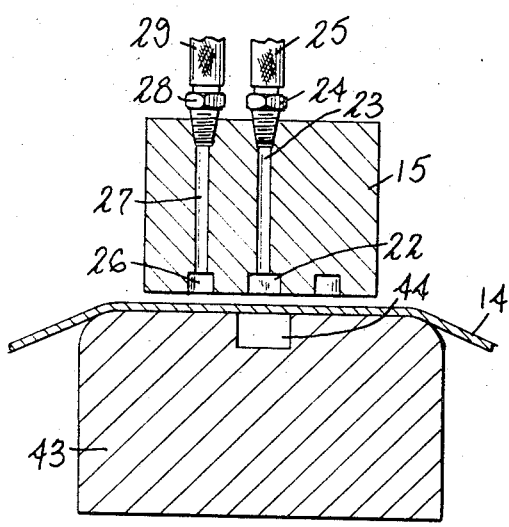
INVENTORS
Allen R. Hollister
William J. Blaiklock

United States Patent Office 3,402,603
Patented Sept. 24, 1968

3,402,603
DETECTION SYSTEM
Allen R. Hollister, East Hartford, and William J. Blaiklock, Collinsville, Conn., assignors to Pratt & Whitney Inc., West Hartford, Conn.
Filed Mar. 24, 1966, Ser. No. 537,203
7 Claims. (Cl. 73—159)

ABSTRACT OF THE DISCLOSURE

This disclosure relates to a detecting system of a pinhole type wherein a detecting head is formed with a first orifice in the underside thereof and a second orifice surrounding said first orifice. Air under pressure is provided to the second orifice to establish a curtain of isolating air around the first orifice and to cushion the head above the test material. Air under pressure is also applied to the first orifice and any change in the pressure of the air supplied to the first orifice is detected.

This invention relates to detecting apparatus, and more particularly relates to apparatus for detecting pin holes in strip or sheet material.

This invention provides a new and improved apparatus for pneumatically sensing small holes or apertures, generally referred to as pin holes, in continuously moving sheet or strip material. The present invention provides a new and improved system for pneumatically detecting pin holes in strip or sheet material which is effective to detect holes through such material which are other than perpendicular to the plane of the material and which might not be detected by other pin hole detecting apparatus, such as those of the photoelectric type. More specifically, the invention provides a new and improved pneumatic detecting head which is biased toward the material to be inspected, but is positioned therefrom in noncontacting relationship by new and improved structure. A detecting head embodying the invention further includes means for isolating the pneumatic detecting head from the ambient atmosphere and air pressure to improve the sensitivity of the orifice.

Briefly stated, the invention in one form thereof comprises one or more pneumatic detecting heads which are held above and biased toward the plane of the strip material to be inspected. The heads include an elongated first orifice which is supplied air under pressure through a back pressure gaging system, and further includes a second orifice of such configuration as to completely surround the first orifice and effective to emit a curtain of air about the first orifice, and effectively isolate the first orifice from the ambient air pressure. The detecting heads are biased toward the strip material to be inspected, but are positioned in non-contacting relation thereto above such material by the pressure emanating from the first orifice and the curtain of air about the first orifice. In the gaging system, means responsive to a decrease in the back pressure indicative of detection of a pin hole may be provided to actuate mechanism to indicate the location of any detected pin holes.

Accordingly, an object of this invention is to provide new and improved apparatus for detecting pin holes in sheet or strip material.

Another object of this invention is to provide new and improved detecting apparatus for locating pin holes in strip or sheet material where the pin holes may extend to the strip material in a direction other than perpendicular to the plane of the material.

Another object of this invention is to provide a new and improved pneumatically actuated detecting head for apparatus of the type described.

A further object of the invention is to provide pneumatic detecting heads of the type described which are self-positionable in non-contacting relationship above the strip material to be inspected.

A still further object of this invention is to provide a pneumatic detecting head having a detecting orifice which is isolated from the ambient air by a curtain or screen of air thereabout.

Other objects of the invention will be apparent from the following description.

The features of the invention which are believed to be novel are pointed out with particularity and distinctly claimed in the concluding portion of this specification. However, the invention both as to its organization and operation, together with further objects and advantages thereof may best be appreciated by reference to the following detailed description taken in conjunction with the drawings, in which:

FIG. 5 is a diagram of a system embodying the invention including a schematic of the air system.

FIG. 6 is a fragmented sectional view of a strip of sheet material exemplifying two types of pin holes that might appear therein; and FIG. 7 is a sectional view of a portion of a second embodiment of the invention showing a detecting head with an anvil positioned therebeneath to support very flexible material beneath a detecting head.

Figure 1:
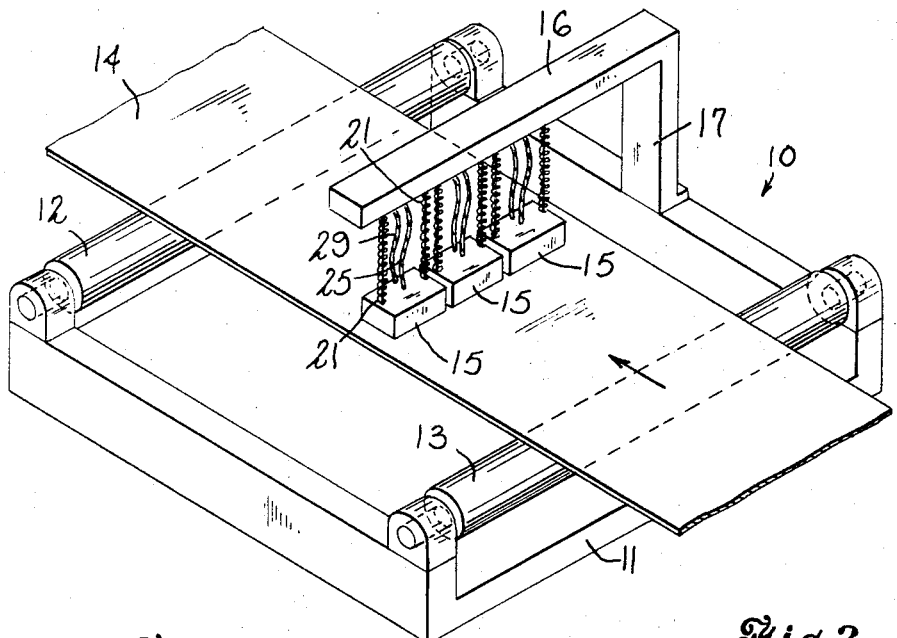
FIG. 1 is a perspective view of detecting apparatus embodying the invention.
Figure 3:
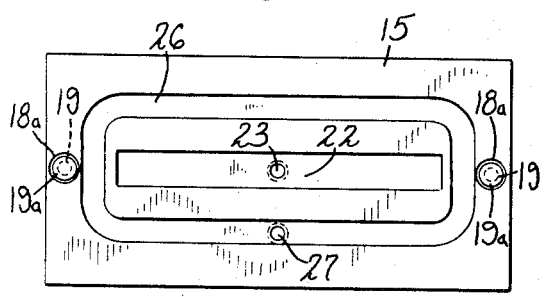
FIG. 3 is a view of the detecting head of FIG. 2 seen in the plane of lines 3—3.
Figure 2:
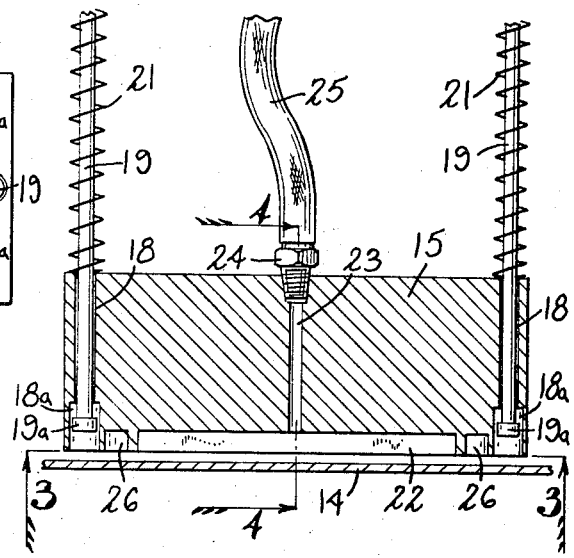
FIG. 2 is an elevation in section of one of the detecting heads of the apparatus shown in FIG. 1.
Figure 4:
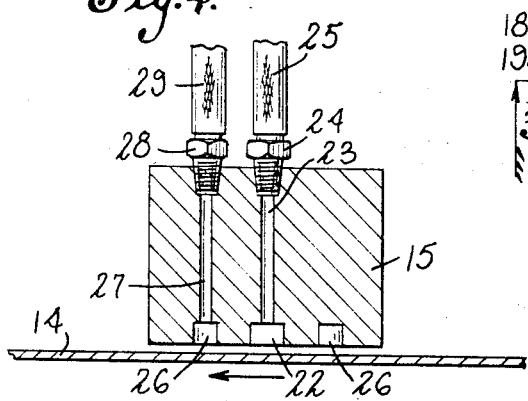
FIG. 4 is a sectional view seen in the plane of lines 4—4 of FIG. 2.

The invention may be embodied in a strip or sheet material rolling or processing line, and in one form 10 comprises a base member 11 rotatably supporting rollers 12 and 13 which define the plane in which the bottom surface of sheet or strip material 14 resides as it passes beneath one or more detecting heads 15. Detecting heads 15 are supported above material 14 and as illustrated may depend from a horizontal arm 16 of a bracket 17 mounted to base member 11. Each of the detecting heads 15 comprises a body member or block having passages 18 therethrough and counterbored on the underside thereof at 18a to receive therethrough rods 19 carried by arms 16. Rods 19 are provided with heads 19a which cooperate with the shoulders defined by the counterbores 18a to limit downward vertical movement of heads 15. Helical springs 21 are interposed between arm 16 and head 15 to bias head 15 downwardly.

Defined in each head 15 and extending transversely thereacross with respect to the direction of travel of material 14 is an orifice 22 which is in communication with a duct or passage 23 defined vertically through head 15 which receives a threaded fitting 24 connected to a flexible air conduit 25. Also defined in the under surface of head 15 is a second orifice 26 which encloses and surrounds orifice 22. A passage 27 is provided through head 15 and receives a threaded fitting 28 therein to which is connected a flexible air conduit 29.

A suitable air system for use in a system embodying the invention is shown in FIG. 5, and may comprise a parallel pneumatic circuit comprising branch lines 31 and 32, each of which receive air under pressure from main conduit 33, and a suitable source of pressure connected thereto, not shown. Positioned in lines 31 and 32, respectively, are pressure regulating valves 34 and 35, each effective to produce a constant pressure in the output lines 31a and 29, respectively, connected thereto. Line 31a is connected through a restriction 36 to line 25 which is, in turn, connected to fitting 24 as previously described. The branch conduit 31, together with the elements therein will be recognized as a typical back pressure gaging system.

In operation, as the material 14 is drawn beneath the detecting heads 15, air is supplied via main conduit 33 to branch conduits 31 and 32. The air under pressure supplied to orifice 26 provides a continuous curtain of air about orifice 22. The air pressure in orifice 26 reacts against the surface of material 14 and, dependent upon the pressure thereof, holds head 15 a predetermined distance above the upper surface of material 14. This ring-like curtain and cushion of air acts against the bias of springs 21 and tends to keep the detecting head 15 level and riding on a curtain of air above the upper surface of strip 14.

Air under pressure is also delivered to orifice 22 by restriction device 36 and line 25. With this arrangement, the air in line 25 and at orifice 22 is emitted from orifice 22 within the curtain of air from orifice 26. Therefore, very little, if any, air will escape between the under surface of the detecting head and the flat surface of the material 14. This maintains a back pressure in that portion of the system connected to orifice 22.

Joined to line 25 is a pneumatically sensitive relay 38 which is effective to sense a drop in the back pressure behind orifice 22. An air pressure indicating instrument 39 may also be connected to line 25 to visually indicate a drop in the back pressure in line 25. When pneumatic relay 38 senses a drop in the back pressure, it energizes a warning device 40.

Warning device 40 may take any suitable form to indicate visually, audibly, or even by marking on sheet material 14 at the detected location, that the presence of a pin hole has been detected. FIG. 6 exemplifies a cross-section of the sheet material 14 having pin holes 41 and 42 therein. It may be noted that pin hole 41 extends essentially through the material 14 while pin hole 42 is inclined through the thickness of material 14. The system disclosed will detect either type of pin hole, one which is substantially perpendicular to the plane of the material or one which is inclined with respect thereto. The air emanating from orifice 22, being fluid, will pass through pin holes such as those illustrated at 42.

The air emanating from orifice 26 serves a two-fold purpose. It essentially isolates the air from orifice 22 from the ambient atmosphere and acts as an air barrier to reduce the leakage from the center orifice. Additionally, it provides a curtain of fluid pressure which supports the heads 15 a predetermined distance over the material 14.

Another embodiment of the invention is illustrated in FIG. 7. This embodiment is adapted to be used with very thin flexible material which would not be self-supporting over a short span, such as rollers 12 and 13, FIG. 1. In FIG. 7 an anvil 43 is provided beneath the heads 15. Anvil 43 is provided with a longitudinal cutout or groove 44 thereacross beneath orifice 22 so that as a pin hole in material 14 passes beneath orifice 22, air emanating therefrom may pass through the pin hole into groove 44. The groove 44 thus provides the passage or conduit for air to escape once it has passed through a pin hole, while the anvil 43 provides a support for the thin flexible material to be subjected to pin hole detection.

It may thus be seen that the objects set forth above as well as those made apparent from the preceding description are efficiently attained.

While preferred embodiments of the invention have been set forth for purposes of disclosure, modification to the disclosed embodiments as well as other embodiments thereof may occur to those skilled in the art. Accordingly, the appended claims are intended to cover all modifications to the disclosed embodiments of the invention as well as other embodiments thereof which do not depart from the spirit and scope of the invention.

What is claimed is:

1. A pneumatic detecting device for detecting pinholes in sheet material comprising a body member having a longitudinally extending orifice defined in the underside thereof, a passage defined through said body member to said orifice, a second orifice defined in the underside of said body member, said second orifice being of generally rectangular configuration spaced from said first orifice and surrounding said first orifice, a second passage defined through said body member to said second orifice, means for supplying air under pressure to said second orifice through said second passage to provide an isolating curtain of air around said first orifice, means for supplying air under pressure to said first orifice through said first passage, and means for detecting a change in the pressure in said first passage.

2. The device of claim 1 wherein said device is arranged to be mounted above the plane of sheet material to be inspected, and means biasing said device toward said plane, the pressure of the air emanating from said second orifice reacting against the sheet material to position said device above the sheet material.

3. The device of claim 2 including means for limiting downward movement of said device.

4. The device of claim 2 further including an anvil positioned below said device adapted to have sheet material pass thereover, said anvil having a groove defined therein below said first orifice.

5. A pneumatic pinhole detecting device comprising a body member having an orifice defined in the underside thereof, a second orifice defined in the underside of said body member, said second orifice being spaced from said first orifice and completely surrounding said first orifice, first and second passages in said body to said orifices, and means for supplying air under pressure to said orifices through said passages such that the air emanating from said second orifice is at a higher pressure than the air emanating from said first orifice and provides an isolating curtain of air about said first orifice.

6. A detection system for use with continuously moving strip material including at least one detecting device, said detecting device comprising a body member having a first elongated orifice defined in the underside thereof, a second orifice defined in the underside of said body member, said second orifice being spaced from said first orifice and surrounding said first orifice, means supporting said device above the plane of sheet material to be inspected, means biasing said device toward said plane, means for supplying air under pressure to said orifices so that the pressure of the air emanating from said second orifice is greater than the pressure of the air emanating from said first orifice and reacts against the sheet material to position said device a predetermined distance above the sheet material and provide an isolating curtain of air about said first orifice, and means for detecting a drop in the pressure at said first orifice.

7. A detection system for use with continuously moving strip material including at least one detecting device, said detecting device comprising a body member having a first orifice defined in the underside thereof, a second orifice defined in the underside of said body member, said second orifice being spaced from said first orifice and enclosing said first orifice, means supporting said device above the plane of sheet material to be inspected, means biasing said device toward said plane, means for supplying air under pressure to said orifices so that the pressure of the air emanating from said second orifice reacts against the sheet material to position said device a predetermined distance above the sheet material, means for detecting a drop in the pressure at said first orifice, an anvil positioned below said device adapted to have sheet material pass thereover, said anvil having a groove defined therein below said first orifice.

References Cited

UNITED STATES PATENTS

| | | | |
|---|---|---|---|
| 3,194,055 | 7/1965 | Knobel | 73—37.5 |
| 3,201,985 | 8/1965 | Williams | 73—37.7 XR |
| 3,246,507 | 4/1966 | Hyde | 73—37.5 XR |

DAVID SCHONBERG, *Primary Examiner.*

J. NOLTON, *Assistant Examiner.*